United States Patent
Seah et al.

(10) Patent No.: US 11,621,789 B2
(45) Date of Patent: Apr. 4, 2023

(54) UNDER-LIQUID COMMUNICATION USING MAGNETO-QUASISTATIC SIGNALS

(71) Applicants: CHEVRON U.S.A. INC., San Ramon, CA (US); CALIFORNIA INSTITUTE OF TECHNOLOGY, Pasadena, CA (US)

(72) Inventors: Robert Kwan Meng Seah, Cypress, TX (US); Hailing An, Houston, TX (US); Baha Tulu Tanju, Katy, TX (US); Darmindra Arumugam, Pasadena, CA (US)

(73) Assignees: Chevron U.S.A. Inc., San Ramon, CA (US); California Institute of Technology, Pasadena, CA (US)

( * ) Notice: Subject to any disclaimer, the term of this patent is extended or adjusted under 35 U.S.C. 154(b) by 44 days.

(21) Appl. No.: 17/089,517

(22) Filed: Nov. 4, 2020

(65) Prior Publication Data

US 2021/0135769 A1    May 6, 2021

Related U.S. Application Data

(60) Provisional application No. 62/931,148, filed on Nov. 5, 2019.

(51) Int. Cl.
*H04B 13/02* (2006.01)
*H01P 3/16* (2006.01)

(52) U.S. Cl.
CPC ............. *H04B 13/02* (2013.01); *H01P 3/16* (2013.01)

(58) Field of Classification Search
CPC .................................................... H04B 13/02
See application file for complete search history.

(56) References Cited

U.S. PATENT DOCUMENTS

2006/0235633 A1* 10/2006 Simons .............. G01R 29/0892
                                                       702/65
2008/0048640 A1*  2/2008 Hull ..................... G01R 31/42
                                                       324/76.77

(Continued)

FOREIGN PATENT DOCUMENTS

WO       2018191428 A1    10/2018

OTHER PUBLICATIONS

"Downhole Applications of Magnetic Sensors" Sensors (Basel) Oct. 2017: 17(10):2384 by Chinthaka P. Gooneratne, Bodong Li and Timothy E. Moellendick, pp. 1-32.

(Continued)

*Primary Examiner* — Hsinchun Liao
(74) *Attorney, Agent, or Firm* — Esplin & Associates, PC

(57) ABSTRACT

Magneto-quasistatic signals may be used to enable under-liquid communication between devices. A magneto-quasistatic signal transmitter of an under-liquid device may transmit a magneto-quasistatic signal conveying communication data through liquid. A magneto-quasistatic signal receiver of another under-liquid device may receive the magneto-quasistatic signal and extract the communication data from the magneto-quasistatic signal. The under-liquid device that received the magneto-quasistatic signal may use the communication data, store the communicate data, and/or relay the communication data (e.g., to another under-liquid device, to an above-liquid device) using another magneto-quasistatic signal.

12 Claims, 3 Drawing Sheets

(56) References Cited

U.S. PATENT DOCUMENTS

| | | | |
|---|---|---|---|
| 2013/0113468 A1 | 5/2013 | Gao | |
| 2014/0154454 A1 | 6/2014 | Ueki | |
| 2014/0266164 A1 | 9/2014 | Arumugam | |
| 2016/0084077 A1 | 3/2016 | Lehr | |
| 2016/0245638 A1 | 8/2016 | Sheinker | |
| 2017/0074625 A1* | 3/2017 | Appleby | F42B 3/11 |
| 2017/0074630 A1* | 3/2017 | Kotsonis | F42D 1/05 |
| 2020/0190970 A1 | 6/2020 | Alvarez | |
| 2021/0131267 A1 | 5/2021 | Seah | |
| 2021/0131810 A1 | 5/2021 | Seah | |

OTHER PUBLICATIONS

A. Koutsou et al., "Preliminary localization results with an RFID based indoor guiding system," in Proc. IEEE WISP, 2007, pp. 1-6.

A. Legchenko, M. Descloitres, C. Vincent, H. Guyard, S. Garambois, et al.. Three-dimensional magnetic resonance imaging for groundwater. New Journal of Physics, Institute of Physics: Open Access Journals, 2011, 13, pp. 025022, 18 pages.

Abrudan, et al. Impact of Rocks and Minerals on Underground Magneto-Inductive Communication and Localization, Jun. 9, 2016, pp. 1-12.

B. Denis, J. Keignart, and N. Daniele, "Impact of NLOS propagation upon ranging precision in UWB systems," in Proc. IEEE Conf. Ultra Wideband Syst. Technol., 2003, pp. 379-383.

C. E. Shannon (Jan. 1949). "Communication in the presence of noise" (PDF). Proceedings of the Institute of Radio Engineers. 37 (1): 10-21.

D. Arumugam, J. Griffin, and D. Stancil, "Experimental demonstration of complex image theory and application to position measurement," IEEE Antennas Wireless Propag. Lett., vol. 10, pp. 282-285, 2011.

D. D. Arumugam, "Single-Anchor 2-D Magnetoquasistatic Position Sensing for Short to Long Ranges Above Ground," in IEEE Antennas and Wireless Propagation Letters, vol. 15, pp. 1325-1328, 2016.

D. D. Arumugam, "Through-the-wall indoor tracking and navigation using deep-sub-wavelength magnetoquasistatics," 2017 IEEE International Symposium on Antennas and Propagation & USNC/URSI National Radio Science Meeting, San Diego, CA, 2017, pp. 1409-1410.

D. D. Arumugam, "Through-the-Wall Magnetoquasistatic Ranging," in IEEE Antennas and Wireless Propagation Letters, vol. 16, pp. 1439-1442, 2017.

D. D. Arumugam, J. D. Griffin, D. D. Stancil and D. S. Ricketts, "Experimental study on the effects of groups of people on magnetoquasistatic positioning accuracy," Proceedings of the 2012 IEEE International Symposium on Antennas and Propagation, Chicago, IL, 2012, pp. 1-2.

D. D. Arumugam, M. Sibley, J. D. Griffin, D. D. Stancil and D. S. Ricketts, "An active position sensing tag for sports visualization in American football," 2013 IEEE International Conference on RFID (RFID), Penang, 2013, pp. 96-103.

J. B. Andersen, T. S. Rappaport and S. Yoshida, "Propagation measurements and models for wireless communications channels," in IEEE Communications Magazine, vol. 33, No. 1, pp. 42-49, Jan. 1995.

Legchenko, A., Baltassat, J-M., Beauce, A., and Bernard, J., 2002, Nuclear magnetic resonance as a geophysical tool for hydrogeologists: Journal of Applied Geophysics, v.50, No. 1-2, p. 21-46.

M. M. Khan, Q. H. Abbasi, A. Alomainy and Y. Hao, "Study of line of sight (LOS) and none line of sight (NLOS) ultra wideband off-body radio propagation for body centric wireless communications in indoor," Proceedings of the 5th European Conference on Antennas and Propagation (EUCAP), Rome, 2011, pp. 110-114.

M. Stojanovic and J. Preisig, "Underwater acoustic communication channels: Propagation models and statistical characterization," in IEEE Communications Magazine, vol. 47, No. 1, pp. 84-89, Jan. 2009.

Non-medical applications of NMR and MRI, MRI NMR Magnetic Resonance, retrieved from the internet [https://www.magnetic-resonance.org/ch/19-01 .html]; Web version 11th edition 2017, Ch. 19, pp. 1-4.

Pake, G.E., 1993, Nuclear magnetic resonance in bulk matter: Physics Today, v.46, p. 46-51.

R. V. L. Hartley (Jul. 1928). "Transmission of Information". Bell System Technical Journal, pp. 535-563.

S. S. Ghassemzadeh, L. J. Greenstein, A. Kavcic, T. Sveinsson and V. Tarokh, "UWB indoor path loss model for residential and commercial buildings," 2003 IEEE 58th Vehicular Technology Conference. VTC 2003-Fall (IEEE Cat. No. 03CH37484), 2003, pp. 3115-3119 vol. 5.

Sana Ramadan, Master thesis: Underwater Communication Throught Magnetic Induction (MI); retrieved from the internet [(https://dalspace.library.dal.ca/bitstream/handle/10222/73429/Sana-Ramadan-MASc-ECED-October-2017.pdf?sequence=1&isAllowed=y)], Dalhousie University, Halifax, Nova Scotia, Oct. 2017 (55 pages).

Z. Jiang and P. Groves, "NLOS GPS signal detection using a dualpolarisation antenna," GPS Solutions, vol. 18, No. 1, pp. 15-26, 2014.

Santini, Tales, et al. "In-vivo and numerical analysis of the eigenmodes produced by a multi-level Tic-Tac-Toe head transmit array for 7 Tesla MRI." PloS one 13.11 (2018): e0206127. (Year: 2018).

\* cited by examiner

UNDER-LIQUID COMMUNICATION USING MAGNETO-QUASISTATIC SIGNALS

CROSS-REFERENCE TO RELATED APPLICATIONS

The present application claims the benefit of U.S. Provisional Application No. 62/931,148, entitled "UNDER-LIQUID COMMUNICATION USING MAGNETO-QUASISTATIC SIGNALS," which was filed on Nov. 5, 2019, the entirety of which is hereby incorporated herein by reference.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention. The invention described herein was made in the performance of work under a U.S. Government contract and is subject to the provisions of Public Law 96-517 (35 USC 202) in which the Contractor has elected to retain title.

FIELD

The present disclosure relates generally to the field of under-liquid communication using magneto-quasistatic signals.

BACKGROUND

Communication signals traveling under liquid (e.g., under the sea/lake/river, inside a liquid tank) may be distorted and/or attenuated by the liquid. For subsea equipment, the range between equipment may prevent the use of RF based communications. Line infrastructure may have to be laid to provide the necessary communications backbone. With increasing desire to monitor subsea equipment and add sensors, either during fabrication or via retrofit, providing the necessary bandwidth and range to, from and between subsea equipment may be cost prohibitive.

SUMMARY

This disclosure relates to under-liquid communication. Magneto-quasistatic signal may be transmitted through liquid by a magneto-quasistatic signal transmitter. The magneto-quasistatic signal may convey communication data. The magneto-quasistatic signal may be received by a magneto-quasistatic signal receiver. The magneto-quasistatic signal receiver may extract the communication data from first magneto-quasistatic signal.

A system that uses under-liquid communication may include one or more magneto-quasistatic signal transmitters, one or more magneto-quasistatic signal receivers, and/or other components. A first magneto-quasistatic signal transmitter may be configured to transmit a first magneto-quasistatic signal through liquid. The first magneto-quasistatic signal may convey communication data. The first magneto-quasistatic signal transmitter may be carried by a first under-liquid device. A first magneto-quasistatic signal receiver may be configured to receive the first magneto-quasistatic signal. The first magneto-quasistatic signal receiver may be configured to extract the communication data from the first magneto-quasistatic signal. The first magneto-quasistatic signal receiver may be carried by a second under-liquid device. The first under-liquid device and the second under-liquid device may be separated by a distance in the liquid.

In some implementations, the first magneto-quasistatic signal may convey the communication data using amplitude modulation and/or frequency modulation.

In some implementations, communication between the first magneto-quasistatic signal transmitter and the first magneto-quasistatic signal receiver via a magneto-quasistatic signal may enable communication between devices in an under-liquid network.

In some implementations, the second under-liquid device may further carry a second magneto-quasistatic signal transmitter. The second magneto-quasistatic signal transmitter may be configured to transmit a second magneto-quasistatic signal through the liquid. The second magneto-quasistatic signal may convey the communication data. The second magneto-quasistatic signal may be received by a second magneto-quasistatic signal receiver of a third under-liquid device.

In some implementations, the second under-liquid device may further carry a second magneto-quasistatic signal transmitter. The second magneto-quasistatic signal transmitter may be configured to transmit a second magneto-quasistatic signal through a waveguide. The second magneto-quasistatic signal may convey the communication data. The second magneto-quasistatic signal may be received by a second magneto-quasistatic signal receiver at or near an end of the waveguide. In some implementations, the waveguide may be a riser, a pipeline, and/or an HVAC duct.

In some implementations, the second magneto-quasistatic signal receiver may be carried by a third under-liquid device or an above-liquid device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to under-liquid communication. Magneto-quasistatic signals may be used to enable under-liquid communication between devices. A magneto-quasistatic signal transmitter of an under-liquid device may transmit a magneto-quasistatic signal conveying communication data through liquid. A magneto-quasistatic signal receiver of another under-liquid device may receive the magneto-quasistatic signal and extract the communication data from the magneto-quasistatic signal. The under-liquid device that received the magneto-quasistatic signal may use the communication data, store the communicate data, and/or relay the communication data (e.g., to another under-liquid device, to an above-liquid device) using another magneto-quasistatic signal.

Figure 1:
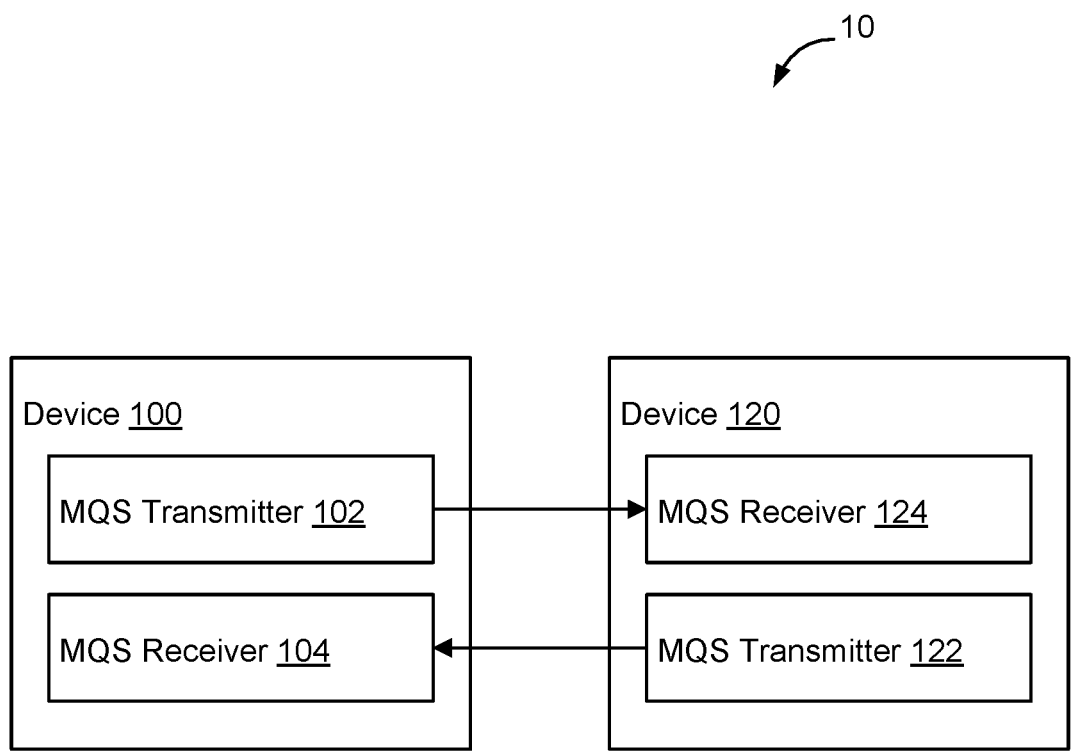
FIG. 1 illustrates an example system that uses under-liquid communication.

The methods and systems of the present disclosure may be implemented by a system and/or in a system, such as a system 10 shown in FIG. 1. The system 10 may include one or more of a device 100 (including a magneto-quasistatic signal transmitter 102 and a magneto-quasistatic signal receiver 104), a device 120 (including a magneto-quasistatic signal transmitter 122 and a magneto-quasistatic signal receiver 124), and/or other components.

A device (e.g., the devices 100, 120) may refer to an object, a thing, and/or equipment made for one or more purposes. A device may be fixed in place or not fixed in place. For example, a device may be fixed in the ground and/or on a structure. A device may be carried by (e.g., attached to, supported by, held by, and/or otherwise carried by) a moving entity. A moving entity may refer to a living or a non-living entity that may moves translationally and/or rotationally. A moving entity may move during a time duration, may move over a distance, move constantly, may move at intervals of time, and/or may otherwise move. Examples of moving entity includes a person, an animal, an object, or a vehicle. An object may include one or more devices, such as a sensor device (e.g., floating sensor). A vehicle may be controlled by a person inside the vehicle or a person outside the vehicle. A vehicle may be an autonomous vehicle or a remote-controlled vehicle. A vehicle may move on the ground, in the air, and/or inside a liquid. In some implementations, one of both the devices 100, 120 may be part of another device. For example, the device 100 may be attached to another device (e.g., a sensor, such as a subsea pump vibration sensor or a retrofit sensor) to enable under-liquid communication for the other device. Other types of devices are contemplated.

The devices 100, 120 may be separate by a distance. The distance between the devices 100, 120 may include one or more medium. A medium may refer to an intervening substance/material between the devices 100, 120. A medium may refer to an intervening substance/material through which one or more signals may travel. A medium may include solid substance/material, gaseous substance/material and/or liquid substance/material. Examples of medium include gas (e.g., air, natural gas), liquid, (e.g., fresh water, sea water, oil, petroleum products), solid (e.g., structure, rock, metal, plastic), and/or other medium. For instance, the devices 100, 120 may be located under the sea (e.g., on a seabed) and the medium between the devices may include sea water, soil, rock, and/or housings of the devices 100, 120. Devices under liquid may be referred to as under-liquid devices. Devices above or at the surface of liquid may be referred to as above-liquid devices. Communication between under-liquid devices and/or between under-liquid devices and above-liquid devices may be enabled using one or more magneto quasistatic signals.

A magneto quasistatic field may refer to a class of electromagnetic field in which a slowly oscillating magnetic field is dominant. A magneto quasistatic field may be generated by low-frequency induction (e.g., in ones, tens, or hundreds of kilo hertz range) from a magnetic dipole or a current loop. The frequency of the magnetic quasistatic wave(s) used to generate the magneto quasistatic field may be adjusted based on the desired range at which the magneto quasistatic field is to be generated.

A magneto quasistatic wave/field may pass through or near non-metallic materials with little loss/distortion. A magneto-quasistatic signal may refer to a magneto quasistatic wave/field that conveys (e.g., carries) data. A magneto-quasistatic signal may be used to enable communication between devices that are separated by medium that makes other types of wireless communication difficult. For example, a magneto-quasistatic signal, within sub-wavelength regimes, may largely be undisturbed by lossy medium and may be able to penetrate through many mediums with low-to-high loss. For instance, RF signal may be attenuated in water and may limit the range of RF signal under water. A magneto-quasistatic signal may pass through water with low attenuation and enable communication through water. Additionally, under-liquid devices may be built with strong metals (e.g., steel) to withstand underwater pressures. A magneto-quasistatic signal may pass through water with lower attenuation/distortion than a RF signal.

The devices 100, 120 may carry one or more magneto-quasistatic signal transmitters, one or more magneto-quasistatic signal receivers, and/or other components. For example, the device 100 may carry a magneto-quasistatic signal transmitter 102, a magneto-quasistatic signal receiver 104, and/or other components, and the device 120 may carry a magneto-quasistatic signal transmitter 122, a magneto-quasistatic signal receiver 124, and/or other components. In some implementations, a device may include either a magneto-quasistatic signal transmitter or a magneto-quasistatic signal receive. A device may not include a magneto-quasistatic signal transmitter based on the device not being configured to transmit data. A device may not include a magneto-quasistatic signal receiver based on the device not being configured to receive data.

A magneto-quasistatic signal transmitter (e.g., the MQS transmitter 102, the MQS transmitter 122) may refer to a device that transmits one or more magneto-quasistatic signals. A magneto-quasistatic signal transmitter may covert energy (e.g., voltage, current, power) into a magneto-quasistatic signal for transmission. A magneto-quasistatic signal transmitter may include one or more antennas to transmit the magneto-quasistatic signal(s). The antenna(s) may include one or more mechanically-based antennas (AMEBA). AMEBA may enable communication transmission at less than a thousand Hertz. AMEBA may enable communication underwater (e.g., under the sea) and/or underground. AMEBA may include one or more magneto-elastic/magneto-strictive components, piezoelectric components, and/or other components.

A magneto-quasistatic signal transmitter may be configured to transmit one or more magneto-quasistatic signals through one or more medium, such as gas, liquid, solid, and/or other medium. A magneto-quasistatic signal may convey data. A magneto-quasistatic signal may convey data using amplitude modulation, frequency modulation, and/or other modulation/data encoding techniques. Data may refer to information collected for use, storage, and/or transmission. Information to be communicated from one device to another device may be referred to as communication data. Conveyance of other types of data by the magneto-quasistatic signal is contemplated.

A magneto-quasistatic signal receiver (e.g., the MQS receiver 104, the MQS receiver 124) may refer to a device that receives one or more magneto-quasistatic signals transmitted by a magneto-quasistatic signal transmitter. A magneto-quasistatic signal receiver may include one or more antennas to receive the magneto-quasistatic signal(s). The antenna(s) may include one or more mechanically-based antennas (AMEBA).

A magneto-quasistatic signal receiver may convert a received magneto-quasistatic signal into energy (e.g., voltage, current, power) for data extraction (extraction of data conveyed by the received magneto-quasistatic signal). A magneto-quasistatic signal receiver may be configured to receive the magneto-quasistatic signal(s) transmitted by one or more magneto-quasistatic signal transmitters. A magneto-quasistatic signal receiver may be configured to extract data (e.g., communication data) from the magneto-quasistatic signal(s). A magneto-quasistatic signal receiver may perform data extraction based on one or more techniques used to convey data in the magneto-quasistatic signal (e.g., amplitude demodulation, frequency demodulation, other demodulation/data decoding techniques). In some implementations, a magneto-quasistatic signal receiver may be configured to generate output signals based on the received magneto-quasistatic signal, and the data may be extracted from the received magneto-quasistatic signal based on the output signals and/or other information.

A magneto-quasistatic signal receiver and/or a device carrying the magneto-quasistatic signal receiver may use the data, store the data, and/or relay the data (e.g., to another device) using another magneto-quasistatic signal.

In some implementations, the antennas of a magneto-quasistatic signal transmitter and the magneto-quasistatic signal receiver may be positioned orthogonally. For example, the magneto-quasistatic signal transmitter may include three coils to transmit the magneto-quasistatic signal(s) and the magneto-quasistatic signal receiver may include three coils to receive the magneto-quasistatic signal(s). The coils may be positioned at different angles with respect to each other to transmit/receive the magneto-quasistatic signal(s) in different directions. For example, one coil may be positioned in a leveled orientation. Another coil may be rotated by ninety-degrees about a horizontal axis. Another coil may be rotated by ninety-degrees about a vertical axis. Other numbers, configurations, and arrangements of antennas are contemplated.

The devices 100, 120 may include other components to facilitate under-liquid communication, such as one or more processors (e.g., a digital processor, an analog processor, a digital circuit designed to process information, a central processing unit, a graphics processing unit, a microcontroller, an analog circuit designed to process information, a state machine, and/or other mechanisms for electronically processing information), one or more electronic storage (e.g., optically readable storage media, such as optical disks, magnetically readable storage media, such as magnetic tape, magnetic hard drive, floppy drive, electrical charge-based storage media, such as EPROM, EEPROM, RAM, solid-state storage media, such as flash drive), signal processing components (e.g., amplifier, filter, encoder, decoder, modulator, demodulator), and/or other components.

While the magneto-quasistatic signal transmitters 102, 122 and the magneto-quasistatic signal receivers 104, 124 are shown as single entities, this is for illustrative purposes only. For example, the magneto-quasistatic signal transmitter 102 and the magneto-quasistatic signal receivers 104 may be separate components or a single component (e.g., magneto-quasistatic signal transducer).

Communication between the devices 100, 120 may be performed through the magneto-quasistatic signal transmitters 102, 122 and the magneto-quasistatic signal receivers 104, 124. For example, the device 100 may send communication data to the device 120 by transmitting a magneto-quasistatic signal conveying the communication with the magneto-quasistatic signal transmitter 102, and the device 120 may obtain the communication data by receiving the magneto-quasistatic signal with the magneto-quasistatic signal receiver 124. The device 120 may send communication data to the device 100 by transmitting a magneto-quasistatic signal conveying the communication with the magneto-quasistatic signal transmitter 122, and the device 100 may obtain the communication data by receiving the magneto-quasistatic signal with the magneto-quasistatic signal receiver 104.

The communication enabled by magneto-quasistatic signal transmitter/receiver may include communication between a paired devices. For example, two devices may be paired with each other for communication through one or more magneto-quasistatic signals. The communication enabled by magneto-quasistatic signal transmitter/receiver may include many-to-one communication. For example, multiple devices may communicate with a single device (e.g., hub device) through one or more magneto-quasistatic signals. The communication enabled by magneto-quasistatic signal transmitter/receiver may include one-to-many communication. For example, a single devices may communicate with multiple device through one or more magneto-quasistatic signals. The communication enabled by magneto-quasistatic signal transmitter/receiver may include many-to-many communication. For example, multiple devices may communicate with multiple device through one or more magneto-quasistatic signals.

In some implementations, communication may be relayed through devices using magneto-quasistatic signals. For example, one or both of the devices 100, 120 may use its magneto-quasistatic signal receiver to receive a magneto-quasistatic signal conveying data, extract the data from the magneto-quasistatic signal, and then relay the data to another device by transmitting another magneto-quasistatic signal(s) (conveying data) through one or more medium using its magneto-quasistatic signal transmitter.

Communication between magneto-quasistatic signal transmitter(s) and magneto-quasistatic signal receiver(s) via magneto-quasistatic signal(s) may enable communication between devices in an under-liquid network. An under-liquid network may refer to a network of devices located under the water, such as a network of devices located under the sea. For example, magneto-quasistatic signal (AMEBA/ULF) may be used to enable communication in a subsea production center Industrial Internet of Things network or a process control network.

In some implementations, one or more magneto-quasistatic signals (conveying data) may be transmitted/received through one or more waveguides. A waveguide may refer to a structure that guides waves. A waveguide may guide wave with minimal loss of energy by restricting expansion to one or two dimensions. A waveguide through which the magneto-quasistatic signal(s) are transmitted/received may include dedicated waveguide (a structure built to serve as a waveguide) or a non-dedicated waveguide (a structure built for another purposes, which is being used as a waveguide). For example, a waveguide through which a magneto-quasistatic signal is transmitted/received may include a riser, a pipeline, an HVAC duct, other underwater-structure, and/or other waveguide.

A magneto-quasistatic signal transmitter and/or a magneto-quasistatic signal receiver may be physically coupled to a waveguide for transmission/reception of magneto-quasistatic signal(s). For example, a magneto-quasistatic signal transmitter and/or a magneto-quasistatic signal receiver may be physically connected to the waveguide and may be able to transmit/receive magneto-quasistatic signal(s) through the waveguide via the physical connection(s).

A magneto-quasistatic signal transmitter and/or a magneto-quasistatic signal receiver may not be physically coupled to a waveguide for transmission/reception of magneto-quasistatic signal(s). For example, a magneto-quasistatic signal transmitter and/or a magneto-quasistatic signal receiver may be not physically connected to the waveguide. A magneto-quasistatic signal transmitter may transmit a magneto-quasistatic signal through one or more medium before the magneto-quasistatic signal travels through the waveguide. For instance, a magneto-quasistatic signal transmitter may be positioned at a distance from the waveguide, and may transmit a magneto-quasistatic signal through its housing and/or other medium (e.g., liquid) between the magneto-quasistatic signal transmitter and the waveguide before the magneto-quasistatic signal travels through the waveguide.

A magneto-quasistatic signal receiver may receive a magneto-quasistatic signal through one or more medium after the magneto-quasistatic signal has traveled through the waveguide. For instance, a magneto-quasistatic signal receiver may be positioned at a distance from the end of the waveguide, and the magneto-quasistatic signal receiver may receive the magneto-quasistatic signal after it leaves the waveguide and travels through medium (e.g., liquid, air) between waveguide and the magneto-quasistatic signal receiver and the housing of the magneto-quasistatic signal receiver.

Figure 3:
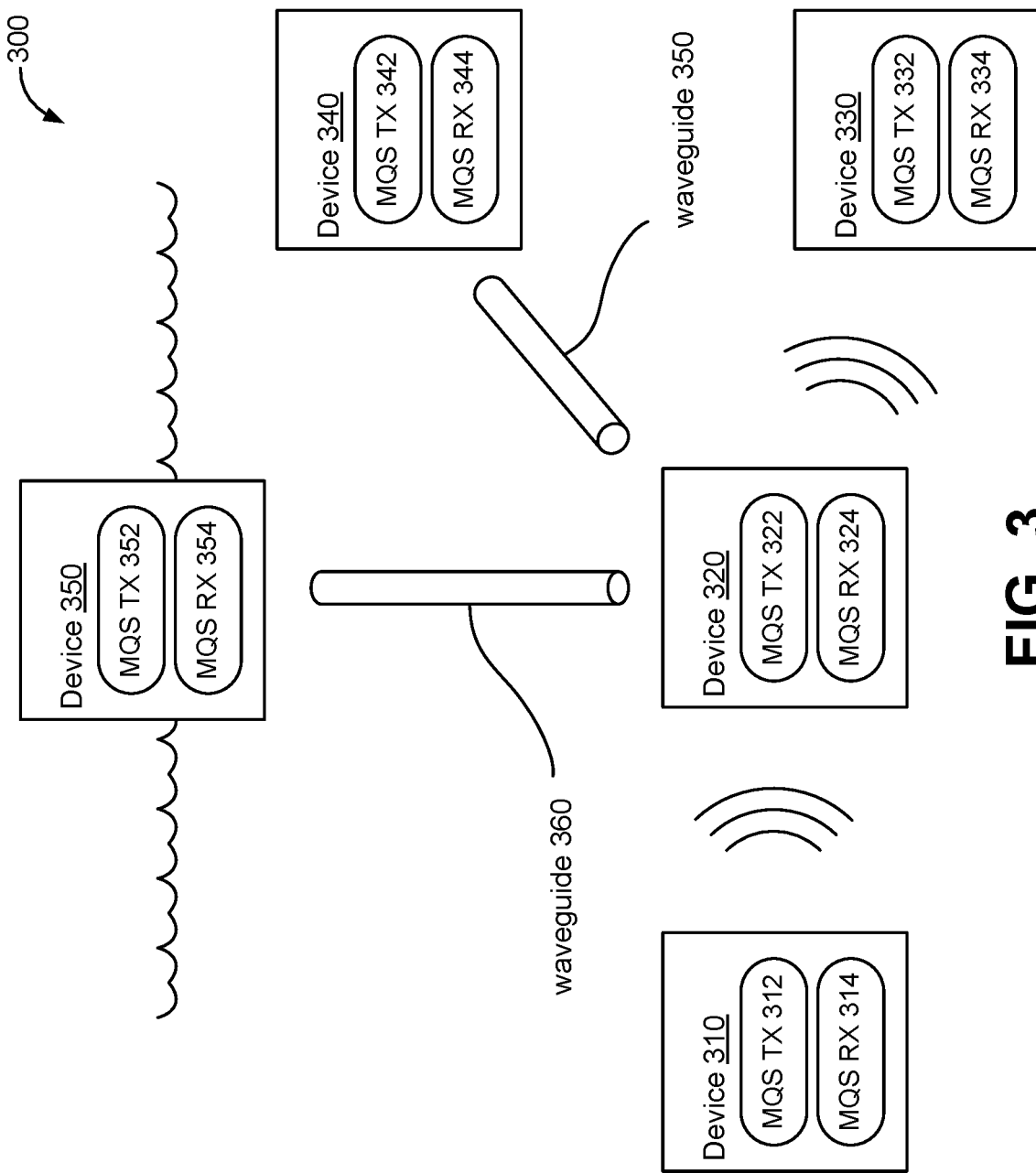
FIG. 3 illustrates an example scenario using under-liquid communication.

FIG. 3 illustrates an example scenario 300 using under-liquid communication. The scenario may include devices 310, 320, 330, 340, 350. The devices 310, 320, 330, 340 may be under-liquid devices (e.g., devices under the sea, devices on seabed, devices moving under the sea). The device 350 may be an above-liquid device (e.g., a device at or above the sea surface). The device 310 may include a magneto-quasistatic signal transmitter 312, a magneto-quasistatic signal receiver 314, and/or other components. The device 320 may include a magneto-quasistatic signal transmitter 322, a magneto-quasistatic signal receiver 324, and/or other components. The device 330 may include a magneto-quasistatic signal transmitter 332, a magneto-quasistatic signal receiver 334, and/or other components. The device 340 may include a magneto-quasistatic signal transmitter 342, a magneto-quasistatic signal receiver 344, and/or other components. The device 350 may include a magneto-quasistatic signal transmitter 352, a magneto-quasistatic signal receiver 354, and/or other components.

The devices 310, 320, 330, 340, 350 may communicate with one another using one or more magneto-quasistatic signals. For example, the device 310 may transmit data to other device(s) using magneto-quasistatic signal(s), and one or more of the devices 320, 330, 340, 350 may use the data, store the data, and/or relay the communication data. For instance, the device 310 may send data to the device 320 by transmitting a magneto-quasistatic signal conveying the data using the magneto-quasistatic signal transmitter 312. The device 320 may receive the magneto-quasistatic signal and extract the data using the magneto-quasistatic signal receiver 322. The device 320 may relay the data to the devices 330, 340, 350 by transmitting one or more magneto-quasistatic signals using the magneto-quasistatic signal transmitter 322. For example, a magneto-quasistatic signal may be transmitted through water and received by the magneto-quasistatic signal receiver 334 of the device 330. A magneto-quasistatic signal may be transmitted through a waveguide 350 (e.g., pipeline) and received by the magneto-quasistatic signal receiver 344 of the device 340. The magneto-quasistatic signal receiver 344 may be positioned at or near the end of the waveguide 350. A magneto-quasistatic signal may be transmitted through a waveguide 360 (e.g., riser) and received by the magneto-quasistatic signal receiver 354 of the device 350. The magneto-quasistatic signal receiver 354 may be positioned at or near the end of the waveguide 360. Other communication between the devices 310, 320, 330, 340, 350 are contemplated.

The use of magneto-quasistatic signal(s) may enable long-range communication in lossy medium, such as under the sea. Rather than requiring laying of communications lines (e.g., fiber-optic cable) and/or close placement of relay/base stations (e.g., placing of relay nodes every 40 feet), magneto-quasistatic signal(s) may be used for downhole communication, subsea transmission through water and/or air, through-metal surface communication, wireless communication, and/or other communication. For instance, by enabling wireless communication with range of hundreds or thousands of meters, use of magneto-quasistatic signal(s) may enable placement of fewer relay/base stations. Additionally, communications with devices embedded within structures (e.g., floating system infrastructure) may be enabled using magneto-quasistatic signal(s) rather than having physical wirings to connect the devices.

The present disclosure may be utilized to facilitate under-liquid communication between a variety of devices and in a variety of environments. The present disclosure may utilize liquid (e.g., seawater), waveguide (e.g., riser, pipeline, HVAC duct), and/or other materials as medium for transmission of under-liquid communication. For example, the present disclosure may be utilized to facilitate downhole signal communication (e.g., transmission of downhole pressure and/or temperature singles in annulus completion fluid to topside or seabed), subsea signal transmission through air and water (e.g., communicating subsea signals to topside, and vice vera), low power sensor communication through metal surface (e.g., transmission of signals from sensor located on high pressure containing equipment subsea, such as pipeline, pump, compressor, etc.), and/or vehicle communication/data transmission (e.g., communication/transmission of data from moving entities, such as autonomous underwater vehicle/remotely operated vehicle in seawater or confined spaces). Other communication applications are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the devices 100, 120, the magneto-quasistatic signal transmitters 102, 122, and the magneto-quasistatic signal receivers 104, 124 are shown in FIG. 1 as single entities, this is for illustrative purposes only. One or more of the components of the system 10 may be contained within a single device or across multiple devices.

Figure 2:
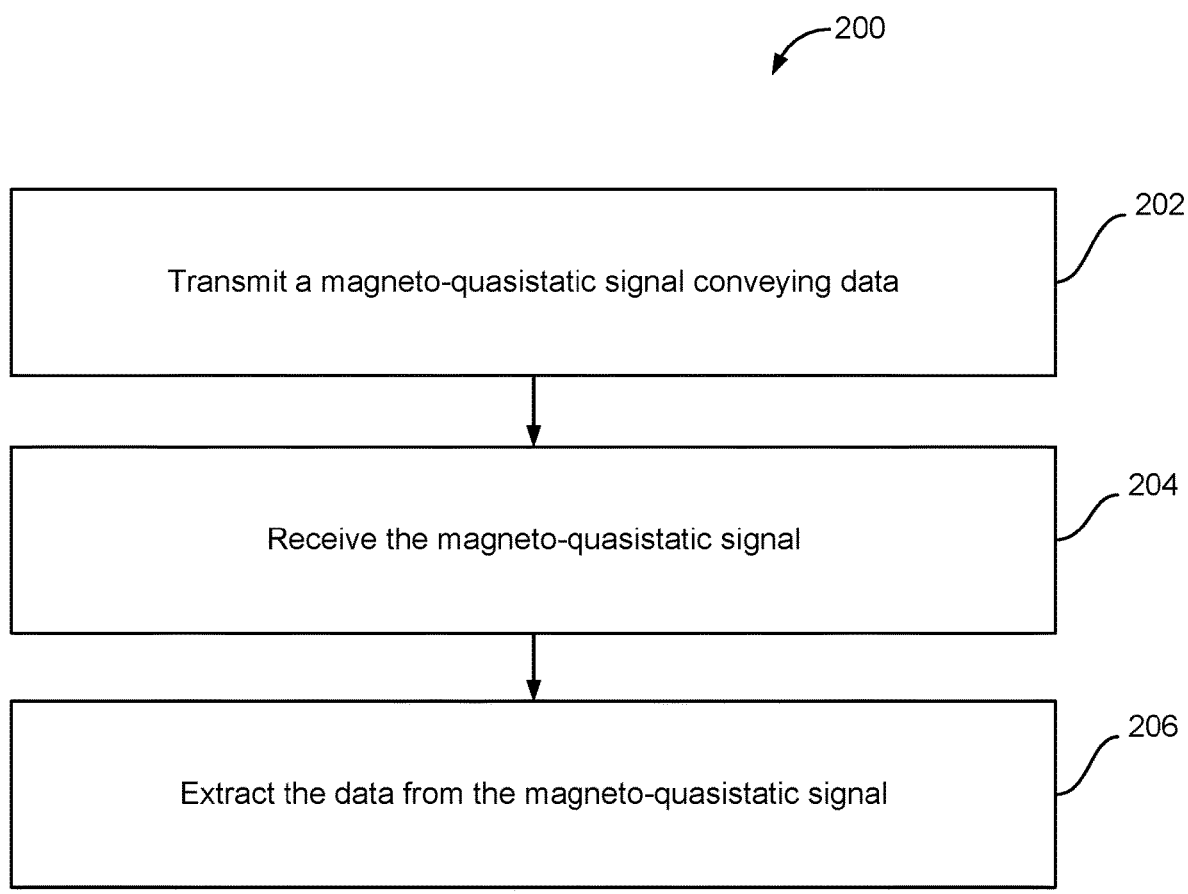
FIG. 2 illustrates an example method for under-liquid communication.

FIG. 2 illustrates method 200 for under-liquid communication. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, a magneto-quasistatic signal may be transmitted through liquid. The magneto-quasistatic signal may convey data. In some implementation, operation 202 may be performed by a component the same as or similar to the magneto-quasistatic signal transmitter 102 (Shown in FIG. 1 and described herein).

At operation 204, the magneto-quasistatic signal may be received. In some implementation, operation 204 may be performed by a component the same as or similar to the magneto-quasistatic signal receiver 124 (Shown in FIG. 1 and described herein).

At operation 206, the data may be extracted from the magneto-quasistatic signal. In some implementation, operation 206 may be performed by a component the same as or similar to the magneto-quasistatic signal receiver 124 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for under-liquid communication, the system comprising:
   a first magneto-quasistatic signal transmitter configured to transmit a first magneto-quasistatic signal through liquid, the first magneto-quasistatic signal conveying communication data, wherein the first magneto-quasistatic signal transmitter is carried by a first under-liquid device; and
   a first magneto-quasistatic signal receiver configured to receive the first magneto-quasistatic signal and extract the communication data from the first magneto-quasistatic signal, wherein the first magneto-quasistatic signal receiver is carried by a second under-liquid device, the first under-liquid device and the second under-liquid device separated by a distance in the liquid, the second under-liquid device further carries a second magneto-quasistatic signal transmitter configured to transmit a second magneto-quasistatic signal through a waveguide, the second magneto-quasistatic signal conveying the communication data, and the second magneto-quasistatic signal is received by a second magneto-quasistatic signal receiver at or near an end of the waveguide.

2. The system of claim 1, wherein communication between the first magneto-quasistatic signal transmitter and the first magneto-quasistatic signal receiver via a magneto-quasistatic signal enables communication between devices in an under-liquid network.

3. The system of claim 1, wherein:
   the second under-liquid device further carries a third magneto-quasistatic signal transmitter configured to transmit a third magneto-quasistatic signal through the liquid, the third magneto-quasistatic signal conveying the communication data; and
   the third magneto-quasistatic signal is received by a third magneto-quasistatic signal receiver of a third under-liquid device.

4. The system of claim 1, wherein the second magneto-quasistatic signal receiver is carried by a third under-liquid device or an above-liquid device.

5. The system of claim 1, wherein the waveguide is a riser, a pipeline, or an HVAC duct.

6. The system of claim 1, wherein the first magneto-quasistatic signal conveys the communication data using amplitude modulation and/or frequency modulation.

7. A method for under-liquid communication, the method comprising:
   transmitting, by a first magneto-quasistatic signal transmitter, a first magneto-quasistatic signal through liquid, the first magneto-quasistatic signal conveying communication data, wherein the first magneto-quasistatic signal transmitter is carried by a first under-liquid device; and
   receiving, by a first magneto-quasistatic signal receiver, the first magneto-quasistatic signal, wherein the first magneto-quasistatic signal receiver is carried by a second under-liquid device, the first under-liquid device and the second under-liquid device separated by a distance in the liquid; and
   extracting, by the first magneto-quasistatic signal receiver, the communication data from the first magneto-quasistatic signal;
   wherein the second under-liquid device further carries a second magneto-quasistatic signal transmitter configured to transmit a second magneto-quasistatic signal through a waveguide, the second magneto-quasistatic signal conveying the communication data, and the second magneto-quasistatic signal is received by a second magneto-quasistatic signal receiver at or near an end of the waveguide.

8. The method of claim 7, wherein communication between the first magneto-quasistatic signal transmitter and the first magneto-quasistatic signal receiver via a magneto-quasistatic signal enables communication between devices in an under-liquid network.

9. The method of claim 7, wherein:
the second under-liquid device further carries a third magneto-quasistatic signal transmitter configured to transmit a third magneto-quasistatic signal through the liquid, the third magneto-quasistatic signal conveying the communication data; and
the third magneto-quasistatic signal is received by a third magneto-quasistatic signal receiver of a third under-liquid device.

10. The method of claim 7, wherein the second magneto-quasistatic signal receiver is carried by a third under-liquid device or an above-liquid device.

11. The method of claim 7, wherein the waveguide is a riser, a pipeline, or an HVAC duct.

12. The method of claim 7, wherein the first magneto-quasistatic signal conveys the communication data using amplitude modulation and/or frequency modulation.

* * * * *